(12) United States Patent
Huffman et al.

(10) Patent No.: US 8,606,404 B1
(45) Date of Patent: Dec. 10, 2013

(54) SYSTEM AND METHOD FOR CONTROLLING A CLEANING APPARATUS

(75) Inventors: Eric C. Huffman, Lowell, MI (US); David James Aupperlee, Ada, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 484 days.

(21) Appl. No.: 12/816,562

(22) Filed: Jun. 16, 2010

Related U.S. Application Data

(60) Provisional application No. 61/218,541, filed on Jun. 19, 2009.

(51) Int. Cl.
*G05B 19/00* (2006.01)
*B25J 9/16* (2006.01)

(52) U.S. Cl.
CPC ................................ *B25J 9/1697* (2013.01)
USPC ....................................................... 700/259

(58) Field of Classification Search
USPC ....................................................... 700/259
See application file for complete search history.

(56) References Cited

U.S. PATENT DOCUMENTS

| | | | |
|---|---|---|---|
| 2,176,789 A | 10/1939 | Capitani | |
| 3,696,248 A * | 10/1972 | Cunningham et al. | 250/203.2 |
| 3,769,663 A | 11/1973 | Perl | |
| 3,947,676 A | 3/1976 | Battilana et al. | |
| 4,119,900 A * | 10/1978 | Kremnitz | 701/23 |
| 4,306,329 A | 12/1981 | Yokoi | |
| 4,369,543 A | 1/1983 | Chen et al. | |
| 4,462,064 A | 7/1984 | Schweitzer | |
| 4,513,469 A | 4/1985 | Godfrey et al. | |
| 5,634,237 A * | 6/1997 | Paranjpe | 15/319 |
| 5,676,449 A | 10/1997 | Newsome | |
| 5,799,362 A | 9/1998 | Huffman | |
| 5,841,259 A * | 11/1998 | Kim et al. | 318/587 |
| 5,940,930 A | 8/1999 | Oh et al. | |
| 6,131,237 A | 10/2000 | Kasper et al. | |
| 6,457,206 B1 | 10/2002 | Judson | |
| 6,459,955 B1 * | 10/2002 | Bartsch et al. | 700/245 |
| 6,898,820 B2 | 5/2005 | Kasper et al. | |
| 6,968,592 B2 | 11/2005 | Takeuchi et al. | |
| 7,073,226 B1 | 7/2006 | Lenkiewicz et al. | |
| 7,097,321 B2 | 8/2006 | Mehler et al. | |
| 7,113,847 B2 * | 9/2006 | Chmura et al. | 700/245 |
| 7,228,589 B2 | 6/2007 | Miner et al. | |
| 7,320,149 B1 | 1/2008 | Huffman et al. | |
| 7,346,428 B1 | 3/2008 | Huffman et al. | |
| 7,526,362 B2 | 4/2009 | Kim et al. | |

* cited by examiner

*Primary Examiner* — James Trammell
*Assistant Examiner* — Daniel L Greene
(74) *Attorney, Agent, or Firm* — McGarry Bair PC

(57) ABSTRACT

A system for directing a cleaning apparatus on a surface to be cleaned comprises a body having a floor cleaner, at least one wheel operably interconnected with a motor for imparting motion to the wheel, a controller for providing a signal to the motor to control the motion of the at least one wheel, and at least one sensor operably interconnected to the controller for detecting a target on the surface at a distance spaced from the body. The system further comprises a signal emitting device separable from the body comprising a user interface portion for receiving signals from a user and transmitting a representation of those signals to a target projection on the surface. The sensor on the body detects the target projection on the surface and the controller can initiate at least one function to be performed by the body of the cleaning apparatus on the surface.

19 Claims, 8 Drawing Sheets

SYSTEM AND METHOD FOR CONTROLLING A CLEANING APPARATUS

CROSS-REFERENCE TO RELATED APPLICATION

This application claims the benefit of U.S. Provisional Patent Application No. 61/218,541, filed Jun. 19, 2009, which is incorporated herein by reference in its entirety.

BACKGROUND OF THE INVENTION

1. Field of the Invention

The invention relates to a method for directing a driven cleaning apparatus around a surface to be cleaned. The invention further relates to a remote control system for directing a driven cleaning apparatus.

2. Description of the Related Arts

U.S. Pat. No. 4,369,543 to Chen discloses a remote controlled vacuum cleaner with a rechargeable power supply. A signal emitting device transmits radio signals to a corresponding receiving circuit in conjunction with a controller that regulates input to a conventional DC drive motor system to maneuver the cleaner around a surface to be cleaned. U.S. Pat. No. 4,306,329 to Yokoi and U.S. Pat. No. 4,513,469 to Godfrey and U.S. Pat. No. 5,940,930 to Oh disclose remote controlled vacuum cleaners that are controlled by similar radio remote control means.

U.S. Pat. No. 6,457,206 to Judson discloses a remote controlled vacuum cleaner with a fluid mister nozzle for distributing cleaning solution onto a surface and a dryer for drying the cleaning surface. The remote-controlled vacuum cleaner can be maneuvered around a surface to be cleaned via manipulation of a handheld signal emitting device which comprises a control element (e.g., a joystick, a roller ball, or the like) and a radio transmitter for sending control signals to electronic motor drive circuits in the vehicle. The handheld signal emitting device is controlled by a processor and includes a video display for displaying images from one or more cameras located on or within the vacuum cleaner vehicle.

U.S. Pat. No. 6,968,592 to Takeuchi et al. discloses an autonomous vacuum cleaner that can be guided by a position indicator means held by a user during an instructional mode or a homing mode. The position indicator means can comprise a light emitting means or other signal transmitting means. When the self-running vacuum cleaner operates under the instruction mode or homing mode, the cleaner receives a signal from the light-emitting means or the transmitting means and the signal strength is compared to determine the position of the cleaner relative to the position indicator. A controller is configured to direct the cleaner towards the signal emitted by the position indicator.

U.S. Pat. No. 7,526,362 to Kim et al. discloses a method for controlling a mobile robot comprising a three-dimensional pointing procedure. The remote robot control method includes measuring a distance between a remote controller and a robot, calculating an initial position of the remote controller in an inertial navigation frame of the remote controller, calculating an initial position of the robot in the navigation frame of the remote controller, calculating an origin of the inertial navigation frame of the remote controller shown in an inertial navigation frame of the robot, calculating a new position of the remote controller in the inertial navigation frame of the remote controller, and calculating a new position of the robot in the navigation frame of the robot. The robot can be directed along a path to a target in response to a user's gesture with a signal emitting device.

U.S. Pat. No. 7,346,428 to Huffman discloses an autonomously movable home cleaning robot incorporating a sweeper, dust bin, and dusting assembly for sweeping and dusting a floor. The robot further comprises a logic board for directing the robot around the cleaning surface. U.S. Pat. No. 7,320,149 to Huffman discloses an autonomous robotic wet extraction cleaner also having a dusting cloth and logic board.

SUMMARY OF THE INVENTION

According to one embodiment of the invention, a system for directing a cleaning apparatus on a surface to be cleaned comprises a body having a floor cleaner, at least one wheel operably interconnected with a motor for imparting motion to the wheel, a controller for providing a signal to the motor to control the motion of the at least one wheel, and at least one sensor operably interconnected to the controller for detecting a target projection on the surface at a distance spaced from the body. The system further comprises a signal emitting device separate from the body comprising a user interface portion configured to receive signals from a user and transmit a representation of those signals to a target projection on the surface, wherein the representation of those signals has a shape. The sensor on the body is configured to detect the target projection on the surface and the controller is configured to initiate at least one function to be performed by the body of the cleaning apparatus on the surface. The at least one function comprises at least one driving function wherein the controller is configured to provide signals to the motor to control the motion of the at least one wheel to move the cleaning apparatus to the location of the target projection on the surface to be cleaned or a cleaning function wherein the controller is configured to operate the floor cleaner of the body of the cleaning apparatus to perform a cleaning operation on the surface to be cleaned at the location of the target projection on the surface and the at least one function is determined based upon a shape of the detected target projection.

According to another embodiment of the invention, the target projection comprises emitted light. The target projection can comprise a coaxial emission of at least two different wavelengths of light. The target projection can also comprise at least one infrared light, visible light and a combination of infrared and visible light.

According to yet another embodiment of the invention, the at least one function comprises a spot cleaning function to be performed generally at the location of the target projection on the surface. Alternatively, the at least one function comprises a target projection following function wherein the body is driven toward the location of the target projection, and changes course as the location of the target projection changes.

According to another embodiment of the invention, the body further comprises a suction device operably interconnected with a debris opening and a collector for facilitating withdrawal of debris from the surface to the collector through the debris opening.

In yet another embodiment of the invention, the user interface portion comprises a plurality of controls, each of which emits a different type of target projection. The controller can initiate a different one of the at least one function depending on the type of target projection detected.

According to another embodiment of the invention, the signal emitting device comprises a handle and the user interface portion comprises at least one button located adjacent the handle. Alternatively, the signal emitting device can comprise a head-engaging band.

According to another embodiment, the cleaning apparatus comprises an autonomous cleaning robot and the controller is configured to initiate the at least one function to be performed based on the detected target projection as part of a mode of operation of the autonomous cleaning robot.

According to yet another embodiment of the invention, a method for directing a cleaning apparatus on a surface to be cleaned comprises providing a cleaning apparatus on the surface to be cleaned comprising a body having a floor cleaner, at least one wheel operably interconnected with a motor for imparting motion to the wheel, a controller for providing a signal to the motor to control the motion of the at least one wheel, and at least one sensor operably interconnected to the controller for detecting a target on the surface at a distance spaced from the body. The method can further include projecting a target on the surface at a location spaced from the cleaning apparatus. The cleaning apparatus can initiate at least one function based upon the detection of the target. The at least one function comprises at least one driving function wherein the controller provides signals to the motor to control the motion of the at least one wheel to move the cleaning apparatus to the location of the target projection on the surface to be cleaned or a cleaning function wherein the controller operates the floor cleaner of the body of the cleaning apparatus to perform a cleaning operation on the surface to be cleaned at the location of the target projection on the surface and the at least one function is determined based upon a shape of the detected target projection.

According to another embodiment of the invention, the step of projecting a target comprises projecting a target of at least one of infrared and visible light.

According to another embodiment of the invention, the method further comprises the step of selecting a desired function and the step of projecting the target comprises projecting a target representative of the desired function.

According to another embodiment of the invention, a system for directing a cleaning apparatus on a surface to be cleaned comprises a body having a floor cleaner, at least one wheel operably interconnected with a motor for imparting motion to the wheel, a controller for providing a signal to the motor to control the motion of the at least one wheel, and at least one sensor operably interconnected to the controller for detecting a target projection on the surface at a distance spaced from the body. The system further comprises a signal emitting device separate from the body comprising a user interface portion configured to receive signals from a user and transmit a representation of those signals to a target projection on the surface, wherein the representation of those signals has a shape. The sensor on the body detects the shape of the target projection on the surface and the controller initiates at least one function to be performed by the body of the cleaning apparatus on the surface on the surface based on the shape of the detected target projection.

DESCRIPTION OF AN EMBODIMENT OF THE INVENTION

Figure 1:
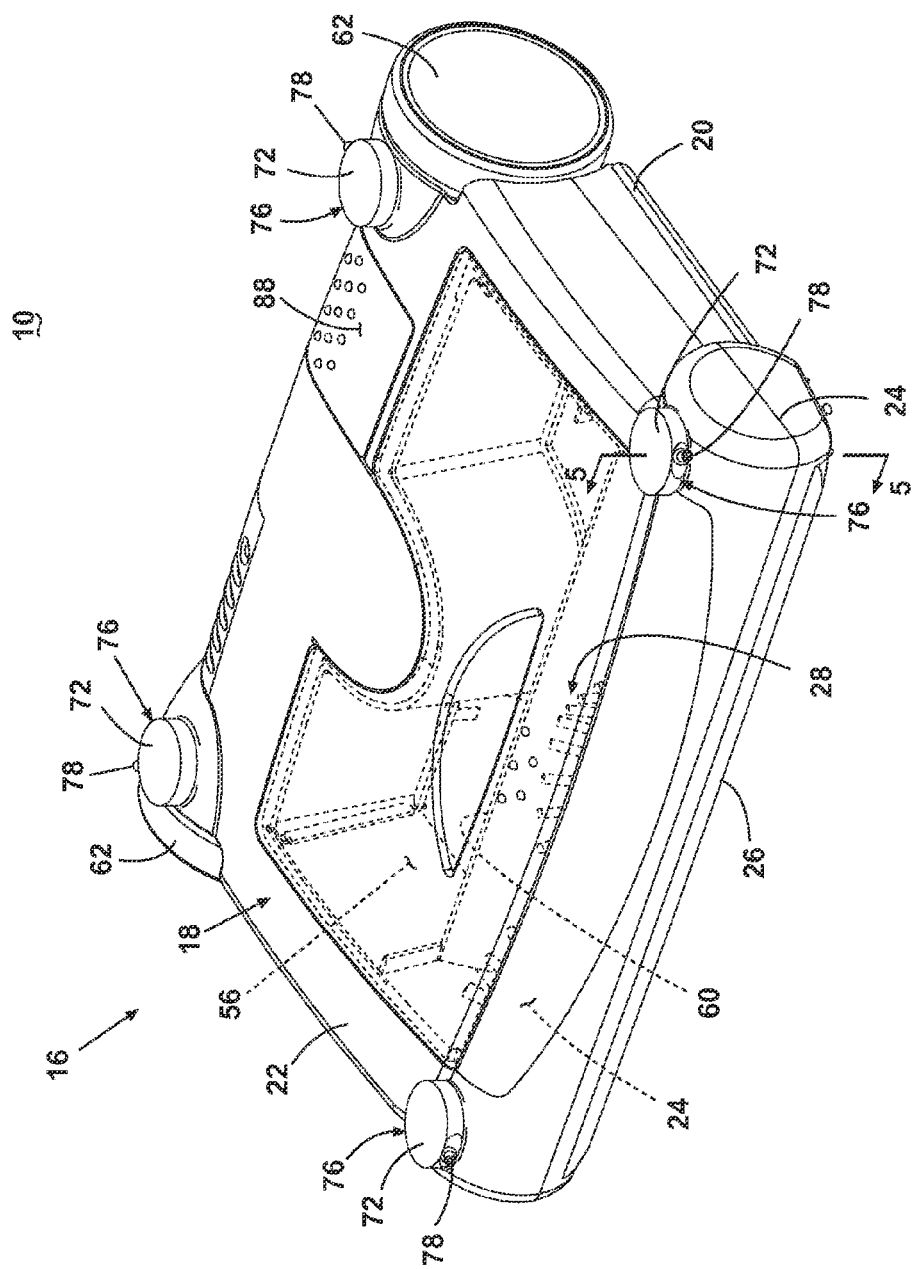
FIG. 1 is a front perspective view of a driven sweeper according to an embodiment of the invention.

FIG. 1 illustrates one embodiment of a cleaning apparatus 10 according to the invention. The cleaning apparatus 10 according to the invention may be any type of driven cleaning apparatus, capable of cleaning, treating and/or disinfecting a surface to be cleaned. Non-limiting examples of a cleaning apparatus for use with the invention include a sweeper, a scrubber, a vacuum cleaner, a steamer, a wet extractor, a mop, an ultraviolet radiation disinfecting device, a treatment dispensing device and combinations thereof. The cleaning apparatus 10 can further comprise an autonomous cleaning robot having any one or combination of previously mentioned cleaning functions. Examples of a cleaning apparatus incorporating an autonomous cleaning robot suitable for use according to the invention are disclosed in U.S. Pat. No. 7,346,428 and U.S. Pat. No. 7,320,149 both assigned to BISSELL Homecare, Inc., which are incorporated herein by reference in their entirety.

Referring still to FIG. 1, the cleaning apparatus 10 can include a powered, driven sweeper 16 comprising a generally rectangular foot assembly 18 further comprising a lower housing 20 secured to an upper housing 22 with screws or other suitable fasteners. A brush chamber 24 can be formed between the lower and upper housings 20, 22 at a forward portion thereof. A brush assembly 28 can be rotatably mounted in the brush chamber 24 to contact the surface to be cleaned through an elongated agitator aperture 26 formed beneath the brush chamber 24 at a forward portion of the lower housing 20.

Figure 2:
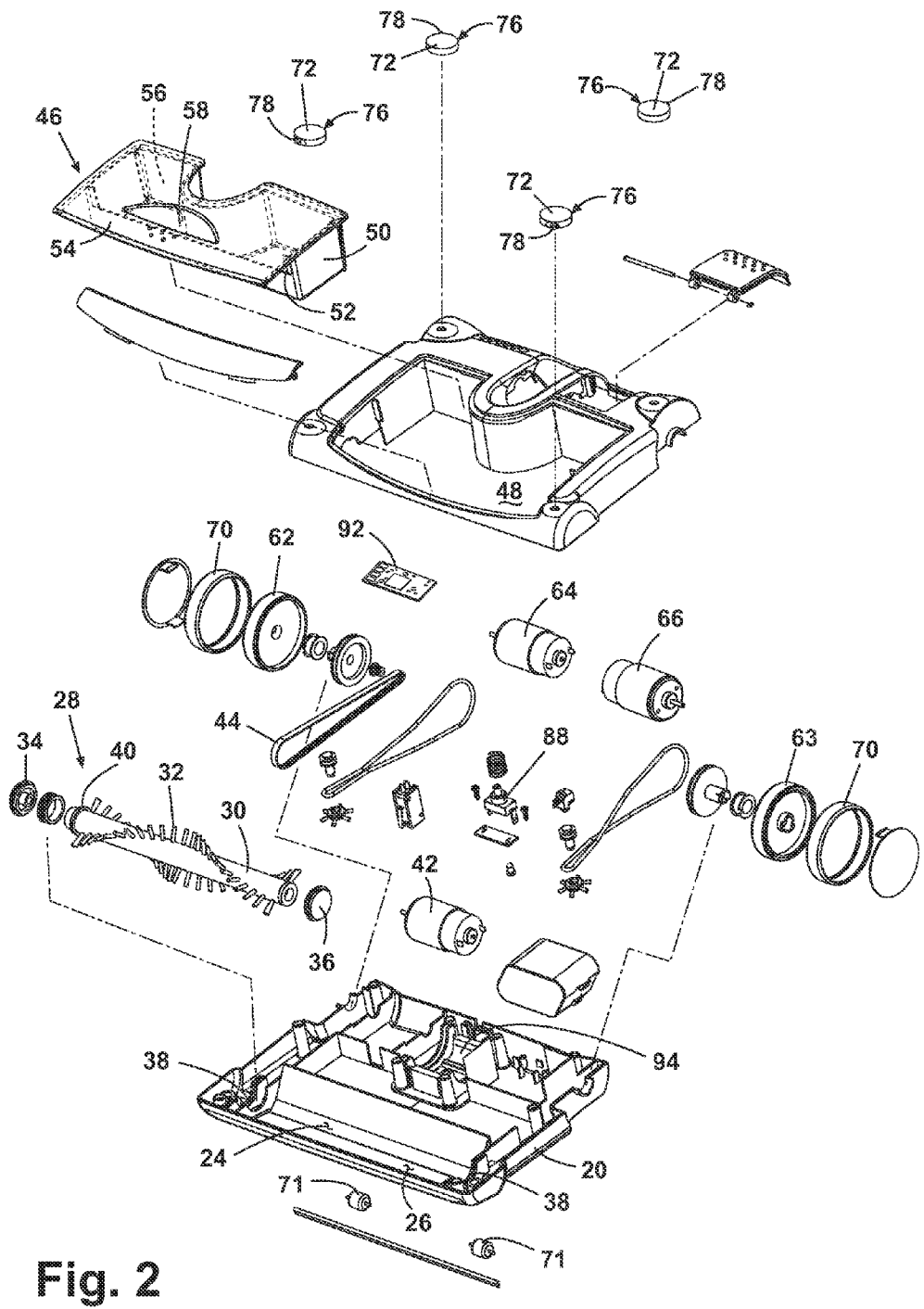
FIG. 2 is an exploded perspective view of the driven sweeper of FIG. 1.

Referring now to FIG. 2, the brush assembly 28 can comprise a cylindrical brush dowel 30 onto which a plurality of bristles 32 are secured using mechanical or non-mechanical fasteners, such as an adhesive, as is known in the art. The brush assembly 28 can be mounted horizontally within the brush chamber 24 between a first and second bearing assembly 34, 36. The first and second bearing assemblies 34, 36 can be rotatably mounted between pairs of opposed mounting ribs 38 protruding from the lower and upper housings 20, 22. The brush dowel 30 can further comprise a brush pulley 40 integrally formed at one end. The brush pulley 40 can be configured to be driven in a conventional manner by a brush motor 42 via a timing belt 44. The brush assembly 28 can be positioned within the brush chamber such that the bristles 32 contact and agitate the surface to be cleaned and throw dirt and dust from the agitator aperture 26 into a dust bin 46 in fluid connection with the brush chamber 24.

A rectangular cavity 48 formed at the mid-section of the foot assembly 18 can be configured to selectively receive the dust bin 46. The dust bin 46 comprises a generally rectangular-shaped receptacle 50 that can be configured to receive dust and debris through an inlet aperture 52 formed in a leading wall 54. A top wall 56 covering the dust bin 46 can further comprise a dust bin grip 58, which can be integrally formed in the top wall 56 and is provided for removal of the dust bin 46 from the foot assembly 18.

The foot assembly 18 can be provided with a right (RH) and left (LH) drive wheel 62, 63 that can be rotatably connected with a rear portion of the lower housing 20. Each drive wheel 62, 63 can be operably connected with a corresponding reversible direct current (DC) RH and LH drive motor 64, 66 via a conventional gear train (not shown). Alternatively, a timing belt, flat belt, or friction drive mechanism can operably connect the drive wheel 62, 63 with a reversible DC drive motor shaft (not shown) in a conventional manner. Each wheel 62, 63 preferably comprises a tread 70 around the wheel perimeter formed of a soft, tacky material to increase friction, improve driving characteristics, and reduce surface scratching as the sweeper maneuvers across a surface to be cleaned. Non-limiting examples of suitable materials include elastomeric materials, rubber, silicone, or the like. A set of rollers 71 can be located near the brush chamber 24 on an underside of the lower housing 20 to support the forward portion of the sweeper 16.

As can best be seen in FIGS. 1, 2, 4 and 5, one or more receiving sensors 72 can be mounted to the upper housing 22 and configured to detect a projected target from a signal emitting device 73 for controlling the movement of the cleaning apparatus 10. The preferred receiving sensor 72 is low cost and compatible with a signal emitted from the signal emitting device 73. For example, if the signal emitted from the signal emitting device 73 comprises an infrared beam, the receiving sensor 72 preferably comprises an infrared sensor module, such as a conventional photodiode. Suitable components are readily commercially available, such as photodiode model PNA4602M from Panasonic Corp., or model 276-640 from Radio Shack Corp. Alternatively, if the transmitted signal comprises a visible laser beam, the receiving sensor preferably comprises a conventional charge coupled device (CCD) or complimentary metal oxide semiconductor (CMOS) image sensor (not shown), although the component costs and computing requirements for this type of system can be higher than the infrared transmitter and sensor system. While the invention is described in the context of infrared beams, it is within the scope of the invention for other types of beams in the visible and non-visible region of the electromagnetic spectrum to be used. Non limiting examples include visible beams generated by LEDs, lasers, or incandescent lights. It is also within the scope of the invention for systems not based on electromagnetic waves to be used, such as a system that uses ultrasonic waves, for example.

Figure 3:
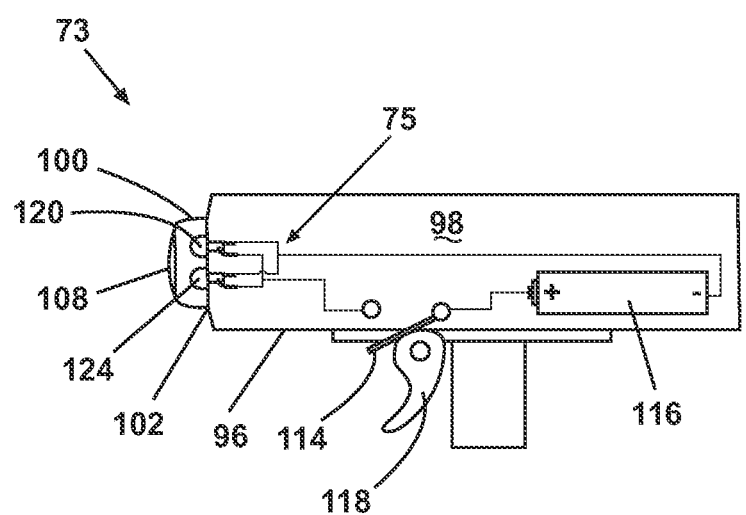
FIG. 3 is a schematic view of a signal emitting device according to an embodiment of the invention.

Referring now to FIG. 3, a battery-powered, hand-held signal emitting device 73 can comprise a housing 96 having an internal cavity 98. A signal transmitter 75 can be mounted within the internal cavity 98 and configured to transmit electromagnetic beams through a transparent circular lens 100 fitted to a distal end 102 of the signal emitting device 73. The signal transmitter 75 preferably emits a dual electromagnetic beam comprising an infrared beam and a visible light beam using an infrared light source 120 and a visible light source 124. The center of the lens 100 preferably comprises a concave focal region 108 for focusing the transmitted beams into coincident beams that terminate in overlapping, infrared and visible light spots on a surface to be cleaned. The projected electromagnetic spots can be detected by the receiving sensors 72 on the sweeper 16 to direct the sweeper 16 around the surface to be cleaned.

The signal emitting device 73 can further include a conventional momentary switch 114 that can be connected in series between a battery 116 and the signal transmitter 75 for selectively delivering power to the signal transmitter 75. The switch 114 can be engaged in a conventional manner via a pivotally mounted trigger 118 or a push button, for example. The battery 116 can be any type of known disposable or rechargeable battery. It is also within the scope of the invention for the signal emitting device 73 to include more than one battery.

The infrared light source 120 can be in the form of an infrared LED for generating an infrared beam. It is also within the scope of the invention for the signal transmitter 75 to comprise a conventional laser diode (not shown). The visible light source 124 can be connected in parallel with the infrared light source 120 for generating a visible light beam. The visible light source 124 can be in the form of a visible LED, a laser, or an incandescent lamp such as a conventional flashlight bulb or the like. The visible light source 124 can comprise a variety of colors and/or shapes or patterns and can project a visible light spot onto a surface to be cleaned. The visible light spot can serve as a visual indicator to a user to indicate the location of the projected infrared spot location. The projected target size of both the infrared spot and the visible spot can range from 0.1-5 inches in diameter. The signal transmitter 75 can be configured to project infrared and visible light beams from two to fifteen feet although it is within the scope of the invention for the projection range to be adjusted based on the specific infrared and visible light source components.

Figure 4:
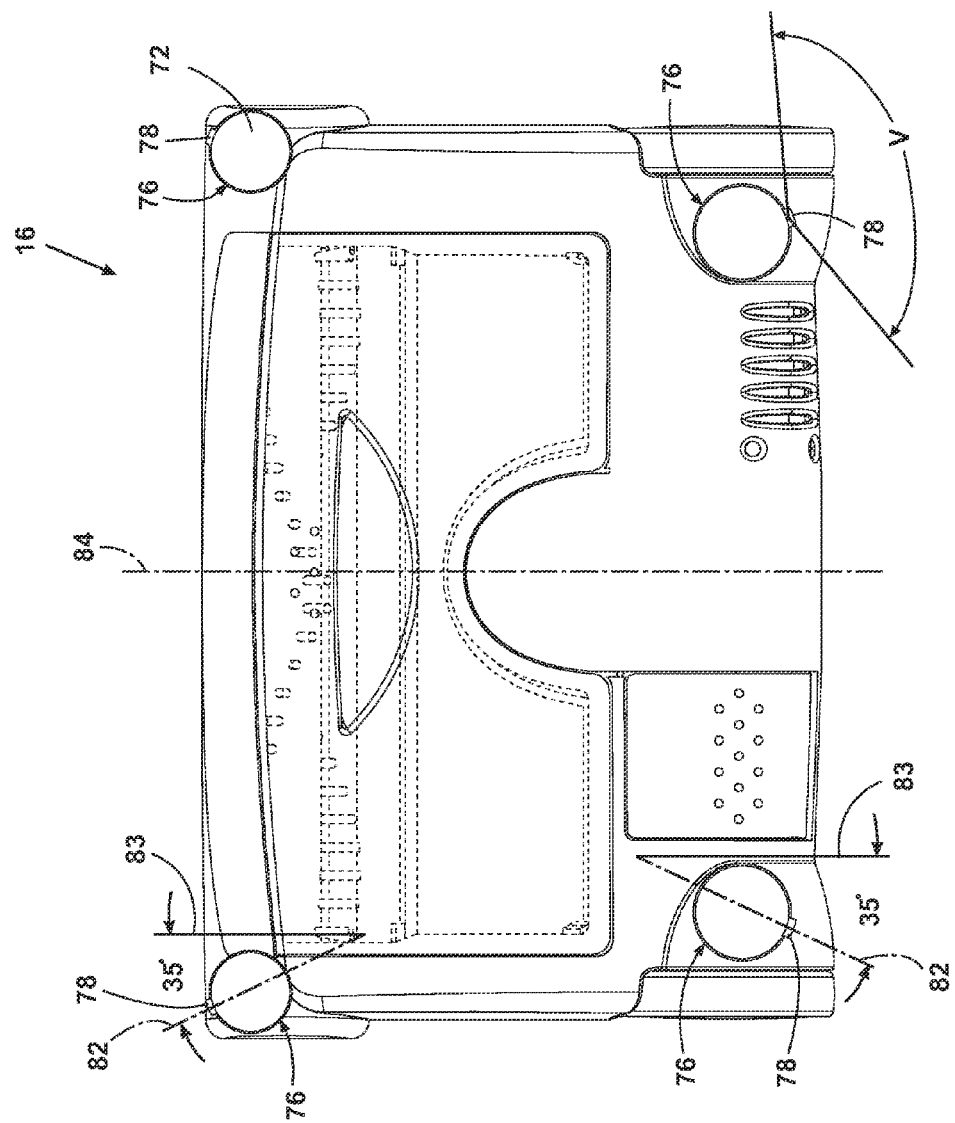
FIG. 4 is a top-down view of the driven sweeper of FIG. 1.
Figure 5:
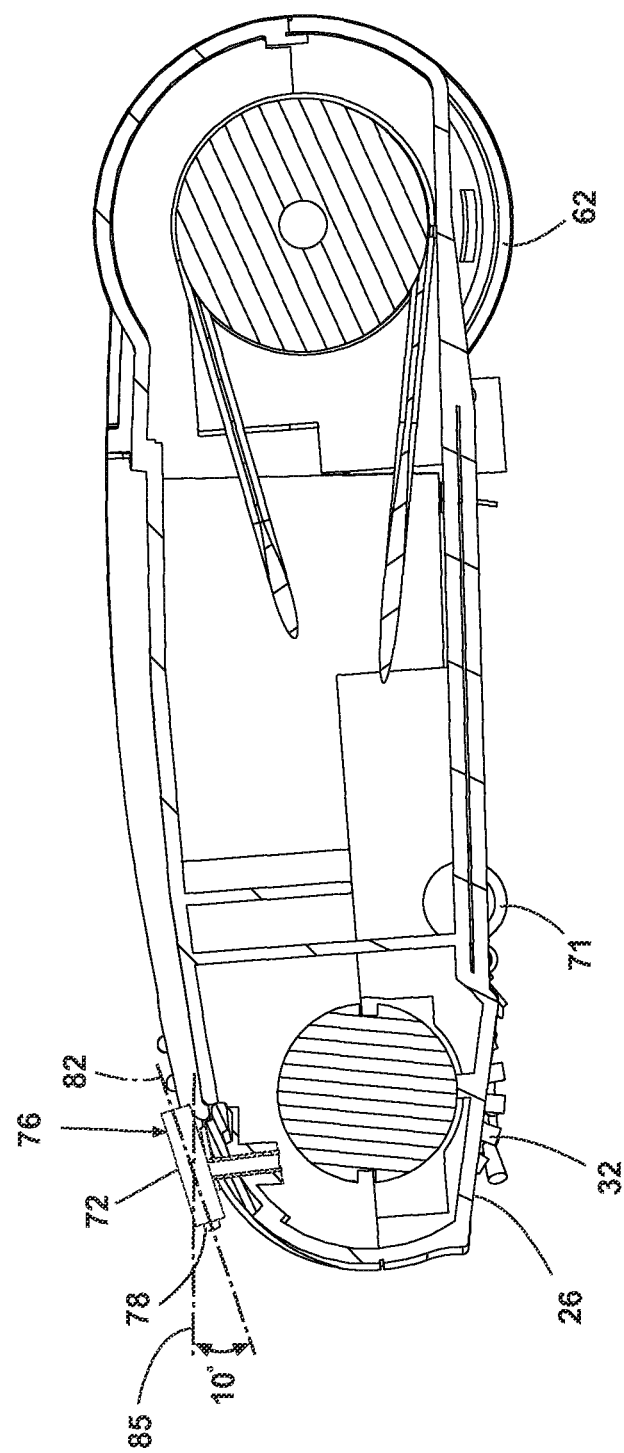
FIG. 5 is a cross-sectional view of the driven sweeper of FIG. 1 taken along line 5-5 of FIG. 1.

Referring now to FIG. 4, the receiving sensors 72 can comprise an infrared sensor module 76 having a hemispherical-shaped lens 78 configured to detect an infrared target projected by the signal emitting device 73. The receiving sensors 72 can be located on the upper housing 22 such that they have a field of view V of approximately 180 degrees; however, the exact location of the receiving sensors 72 on the upper housing 22 and the lens 78 orientation with respect to the cleaning surface can affect the sensor field of view. The location and number of receiving sensors 72 can be selected to provide the desired field of view for effective detection of the target projected by signal emitting device 73. For example, as illustrated in FIG. 4, two receiving sensors 72 can be mounted at the outboard front corners of the sweeper 16 and two additional receiving sensors 72 can be mounted at the outboard rear corners. Each sensor 72 can be secured to the upper housing 22 in a conventional manner such as by screws, snaps, adhesive, or the like. Each sensor 72 can be mounted so that the lens 78 points away from the body of the sweeper 16 and a longitudinal sensor axis 82 is oriented 35 degrees outwardly from a datum 83 parallel to a centerline 84 of the sweeper 16. The angular relationship between the sensor axis 82 and the sweeper centerline 84 can include a broad angular range from 0 degrees (parallel) to 90 degrees (perpendicular), depending on the particular geometric configuration of the foot assembly 18 and the quantity of sensors mounted thereto. Additional sensors can be mounted to the foot assembly 18 to improve signal detection performance as required. Referring now to FIG. 5, which shows a cross-sectional view through line 5-5 of FIG. 1, the sensor lens 78 is preferably oriented so that the longitudinal axis 82 is tipped 10 degrees downwardly from a horizontal datum 85 such that the lens 78 points towards a surface to be cleaned. This tip angle, however, can vary widely between horizontal and vertical axes depending on the particular geometric configuration of the foot assembly 18.

It is also within the scope of the invention for the receiving sensors 72 to be rotatably mounted to the sweeper 16 such that the receiving sensors 72 can rotate or swivel as the sweeper 16 is maneuvered over a surface to be cleaned.

Figure 6:
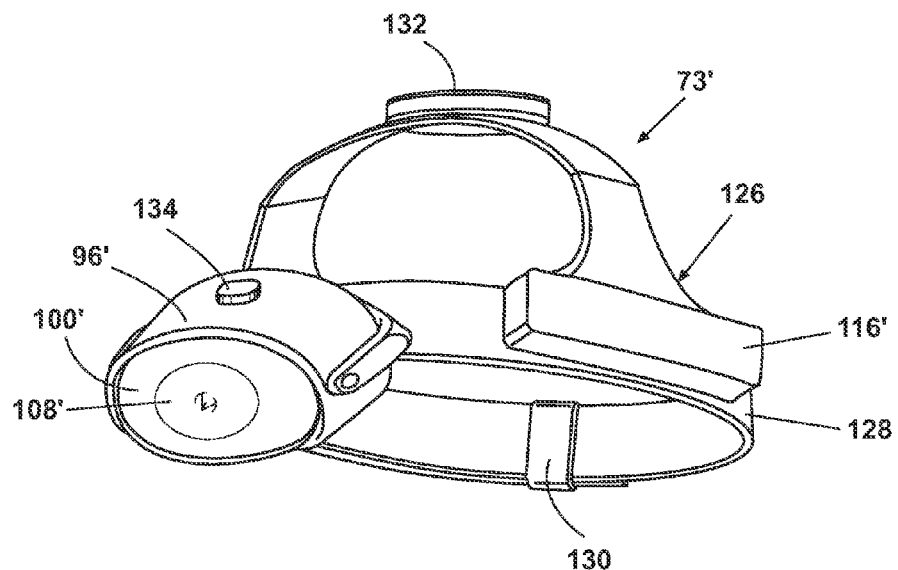
FIG. 6 is a front perspective view of a hands-free signal emitting device according to an embodiment of the invention.

Now referring to FIG. 6, the transmitter 75 can also be in the form of a head-mounted transmitter 75 as part of a hands-free signal emitting device 73'. The hands-free signal emitting device 73 is similar to the hand-held device 73 except that is designed to be mounted to a user's head rather than held in a user's hand. Therefore, elements of the hands-free signal emitting device 73' similar to those of the hand-held signal emitting device 73 are labeled with the same number bearing a prime (') symbol.

The hands-free signal emitting device 73' comprises a head-mounted transmitter 75' adapted to fit snugly on a user's head. The head-mounted transmitter 75' comprises an adjustable head band assembly 126 further comprising conventional elastic straps 128, buckles 130, and an optional securing mechanism 132 which are all well known to those skilled in the art. A transmitter housing 96' is affixed to the front, center portion of the head band assembly 126. The transmitter housing 96' is configured to receive a dual electromagnetic beam transmitter 75' as previously described. A transparent lens 100' is fitted to the face of the transmitter housing 96' and has a central concave focal region 108' configured to focus infrared and visible light beams into coincident beams that terminate in overlapping, projected infrared and visible spots on a cleaning surface. The head-mounted transmitter 75' further comprises a conventional battery pack 116' mounted on the head band assembly 126 and adapted to supply power to the transmitter 75'. Alternatively, the battery pack 116' can be configured for remote connection to the head-mounted transmitter 75' via conventional electrical extension leads (not shown). The battery pack 116' can be adapted for attachment to one's belt and transported by a conventional belt-mounted holster or suitable equivalent. A power switch 134 can be mounted on the transmitter housing 96' for selectively delivering power from the battery pack 116' to the transmitter 75'.

The transmitter 75' can comprise the same infrared and visible light sources 120, 124, respectively as the transmitter 75 according to the embodiment of the hand-held signal emitting device 73 illustrated in FIG. 3.

Although this embodiment has been described in the context of a wearable headband, numerous variations are within the scope of the invention. For example, the transmitter housing 96' can be affixed to alternate wearable articles that permit hands-free use. Non-limiting examples include hats, visors, eye-glasses, goggles, earpieces, wrist bands and the like. Another example includes a mouth stylus that can be mounted to a wheel chair in a conventional manner. Additional examples of head-gear include devices disclosed in U.S. Pat. No. 4,462,064, U.S. Pat. No. 2,176,789, U.S. Pat. No. 5,676,449 and U.S. Pat. No. 3,947,676, which are incorporated by reference in full. Examples of glasses and an ear piece suitable for securing the transmitter housing 96' can be found in U.S. Pat. No. 3,769,663 and U.S. Pat. No. 7,097,321, which are herein incorporated by reference in full.

In addition, although this invention has been described in the context of a cleaning apparatus comprising a powered, driven sweeper, it is recognized that numerous variations are possible whereby the signal receiving sensor 72, control board 92, comparator circuit 95, and drive wheel system can be configured for incorporation into virtually any type of floor cleaning apparatus. According to the invention, the floor cleaning apparatus can be any apparatus capable of cleaning, treating or disinfecting a surface to be cleaned. The floor cleaning apparatus can include, but is not limited to any of the following: a vacuum cleaner, a sweeper, a mop, a steamer, a wet extractor, an ultraviolet radiation disinfecting device, a treatment dispensing device, an autonomous robotic cleaner, and combinations thereof. Non-limiting examples include an unattended extraction cleaner disclosed in U.S. Pat. No. 7,228,589 to Miner et al., portable extraction cleaners disclosed in U.S. Pat. No. 7,073,226 to Lenkiewicz et al. and U.S. Pat. No. 5,799,362 to Huffman, and larger extraction cleaners U.S. Pat. No. 6,131,237 to Kasper et al., and U.S. Pat. No. 6,898,820 to Kasper et al. which are all incorporated herein by reference in their entirety. Furthermore, this invention can be incorporated as a distinct mode in a conventional autonomous cleaning robot previously incorporated by reference, whereby the autonomous robot can be led to a desired cleaning location and upon reaching the target location, can be instructed to commence a particular operational behavior such as a pre-programmed cleaning pattern and the like.

Figure 7:
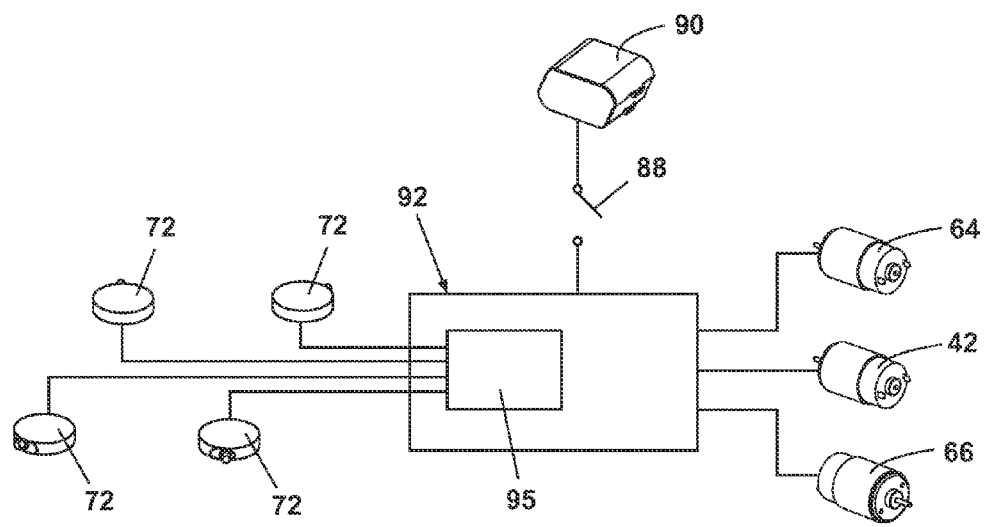
FIG. 7 is a schematic view of the driven sweeper of FIG. 1.

Now referring to FIG. 7, which illustrates a schematic electric diagram of the driven sweeper 16, a conventional electrical power switch 88 can be configured to selectively control the flow of power from one or more rechargeable batteries 90 to a controller 92 which are both mounted inside a cavity 94 formed between the lower and upper housings 20, 22. The controller 92 can be operably coupled with the drive wheel motors 64, 66, the brush motor 42 and the receiving sensors 72 for controlling the operation of the sweeper 16 in response to one or more projected targets detected by the receiving sensors 72. The controller 92 can also be operably coupled with any other additional components of the cleaning device 10 for maneuvering over and cleaning a surface such as a blower fan and motor, a solution dispensing system and a liquid extraction system, for example.

The controller 92 can also include a conventional comparator circuit 95 configured to receive sensor inputs and, in turn, provide conditioned output to the motorized components, including the RH and LH drive wheel motors 64, 66, and optionally, the brush motor 42. Output signals to the motorized components change as inputs from the receiving sensors 72 change. The relative position of an infrared beam in the sensor field of view affects the intensity of signals to the comparator circuit 95 and the subsequent conditioned output signals that regulate power delivered to the motorized components. Accordingly, the position of a target infrared projection in relation to a receiving sensor 72 can alter the rotational velocity and/or direction of the RH and LH drive wheel motors 64, 66 to direct the sweeper 16 towards the target. For example, when an infrared beam is projected on a location in front and to the right of the sweeper 16, the RH corner receiving sensor 72 delivers an intense signal to the comparator circuit 95. The resulting output signals from the comparator circuit 95 reduce power to the RH drive wheel motor 64, thereby reducing the RH drive wheel 62 rotational velocity. Since the drive wheels 62, 63 are now moving at different speeds, the sweeper 16 turns in the direction of the slower turning RH drive wheel 62. The sweeper 16 can thus be maneuvered along a desired path to a desired target remote from the user and the signal emitting device 73 by projecting infrared signals along the floor to guide the sweeper 16 to the target. The comparator circuit 95 in alternate driven cleaning apparatus embodiments such as a wet extractor, vacuum or steam cleaning apparatus, can be configured to provide conditioned output to a variety of additional electrical components including, but not limited to vacuum motors, auxiliary brush motors, heaters, fluid pumps, valves, and the like.

A method of operation of the cleaning device 10 will now be described according to an embodiment of the invention. While the method of operation is described in the context of the hand-held signal emitting device 73, the method of operation can be performed in much the same way using the hands-free signal emitting device 73'. In operation, a user can prepare the sweeper 16 for use by turning on the power switch 88 thereby connecting power from the battery 90 to energize the receiving sensors 72, control board 92, and motorized components, including RH and LH drive wheel motors 62, 63. Next, the user grasps the hand-held signal emitting device 73 and points the lens 100 towards a surface to be cleaned. The user can then actuate the transmitter 75 of the signal emitting device 73 by pulling the trigger 118. The trigger 118 depresses the momentary switch 114 thereby connecting the battery pack 116 and energizing transmitter 75.

Figure 8:
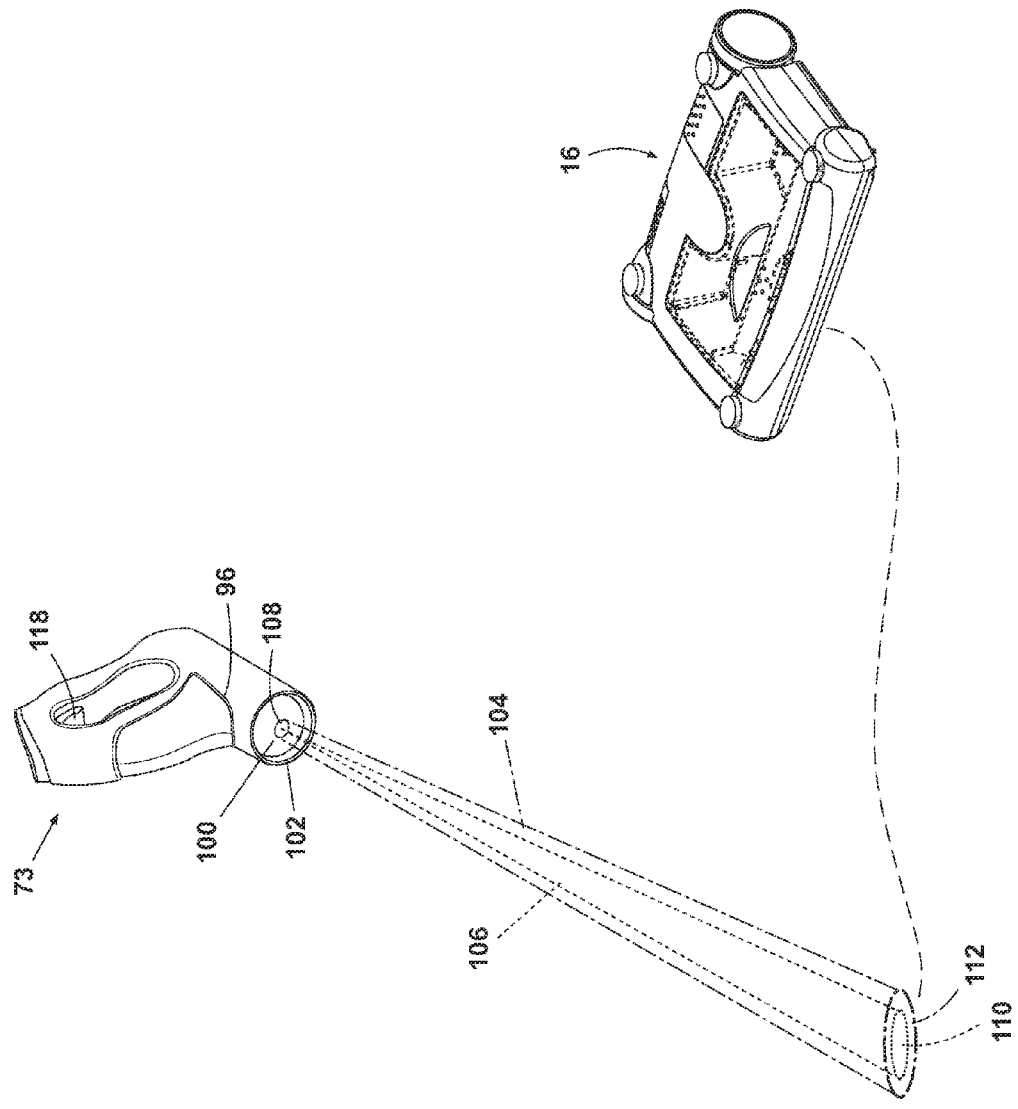
FIG. 8 illustrates the use of a signal emitting device and a driven sweeper according to an embodiment of the invention.

As illustrated in FIG. 8, when the transmitter 75 is energized, power is delivered to the infrared light source 120 and the visible light source 124 simultaneously such that an infrared beam 104 and a visible light beam 106 are emitted through the transparent lens 100. The central concave focal portion 108 of the lens 100 focuses the two beams into a coincident projected beam that terminates in overlapping, coincident infrared and visible target projections 110, 112 on a surface to be cleaned. The visible light projection 112 indicates the location of the projected infrared projection 110 and provides tactile visual user feedback necessary for guiding the apparatus along a desired path and to a desired target. As the user manipulates the hand-held signal emitting device 73 to move the infrared and visible light spots around a surface to be cleaned, the receiving sensors 72 mounted at the outboard corners of the sweeper 16 can detect the projected infrared spot 110. The receiving sensors 72 deliver output signals to a comparator circuit 95. The intensity of the output signals depends on the proximity of the projected infrared projection 110 to the receiving sensor 72. The comparator circuit 95 measures the relative output signal intensity from each receiving sensor 72 and provides conditioned output to the RH and LH drive wheel motors 64, 66. The conditioned output selectively regulates the power delivered to the RH and/or LH drive wheel motors 64, 66 thereby directing the sweeper 16 to turn, continue forward, stop, or reverse in order to follow the projected infrared projection 110 emitted from the transmitter 75 contained in the hand-held signal emitting device 73.

Figure 9:
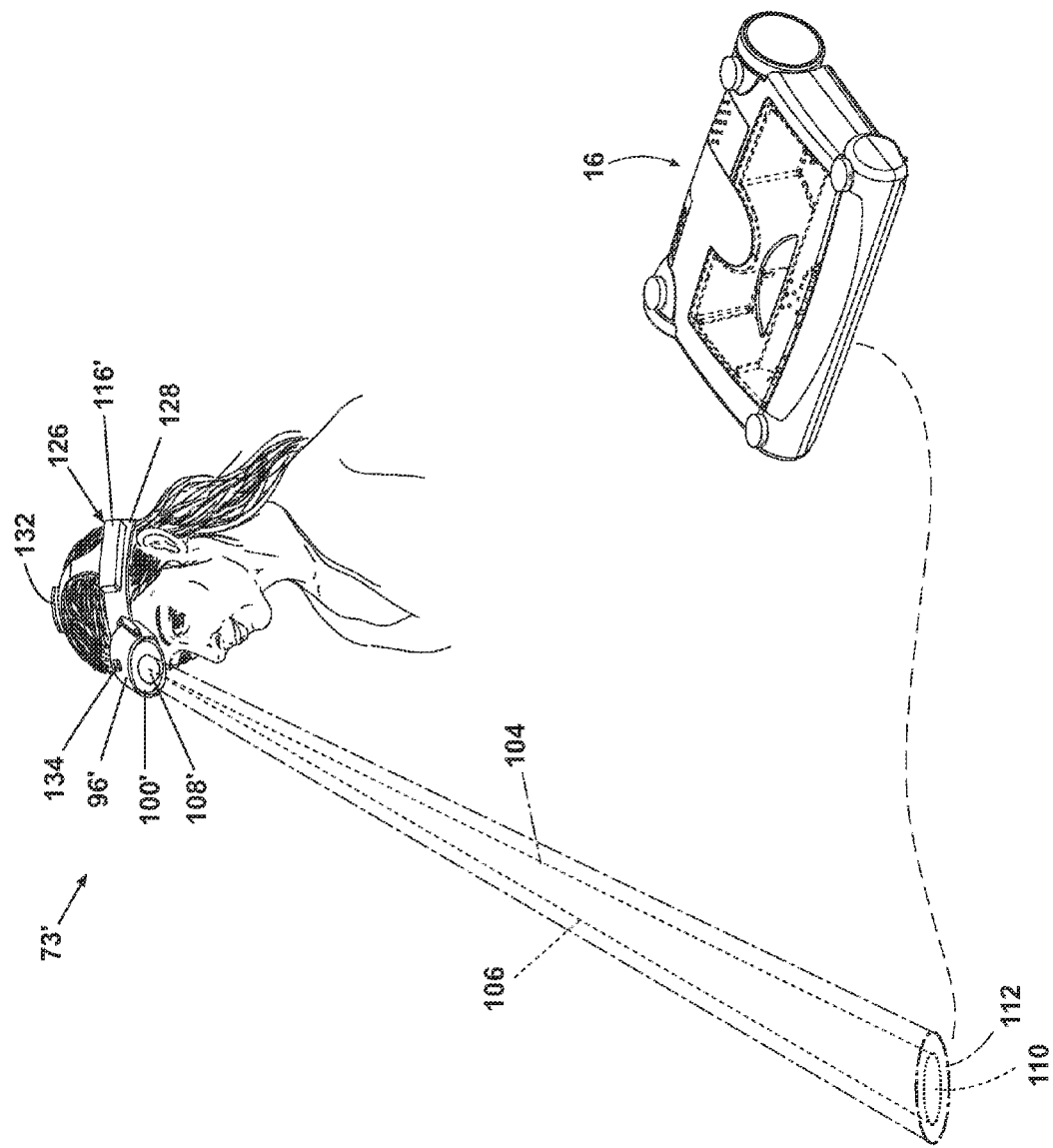
FIG. 9 illustrates the use of a hands-free signal emitting device and a driven sweeper according to an embodiment of the invention.

Referring now to FIG. 9, the operation of the cleaning device 10 using the hands-free device 73' occurs in much the same way as the operation using the hand-held signal emitting device 73. If the user is using the hands-free signal emitting device 73', the user can secure the device 73' to his or her head using the head band assembly 126. The same transmitter 75 can be used in either the hand-held signal emitting device 73 or the hands-free signal emitting device 73'. In the hands-free signal emitting device 73', the transmitter 75 can be energized by actuating the power switch 134. When the transmitter 75 is energized, power is delivered to the infrared light source 120 and the visible light source 124 simultaneously such that an infrared beam 104 and a visible light beam 106 are emitted through the transparent lens 100. The sweeper 16 can detect the infrared light projection 110 and control the movement of the sweeper 16 in the same manner as described above with respect to the hand-held signal emitting device 73.

The sweeper 16 can be set up such that it is a single mode device in which maneuvering and cleaning functionalities are actuated simultaneously by the power switch 88. Alternatively, the sweeper 16 can be set up such that is a multi-mode device in which maneuvering and one or more cleaning functionalities can be selectively actuated by a user separately. For example, in the single mode set-up, the drive wheel motors 64, 66 and the brush assembly 28 can be actuated by the power switch 88 such that the sweeper 16 automatically starts to clean the surface when the power switch 88 is activated. In this manner, the sweeper 16 automatically starts cleaning the surface to be cleaned as soon as the power switch 88 is actuated and continues to clean as the sweeper 16 is maneuvered over the surface.

Alternatively, in the dual mode set-up, the sweeper 16 can be set up such that the user can maneuver the sweeper 16 to a desired location prior to starting the cleaning process. For example, the power switch 88 can be set up such that when the user presses the power switch 88 for a first time, power is sent to the drive wheel motors 64, 66 but not to the brush assembly 28 such that the user can maneuver the sweeper 16 over a surface without cleaning the surface. When the sweeper 16 is at the desired location, the user can press the power switch 88 a second time to actuate the brush assembly 28 such that the cleaning process can begin. The cleaning process can continue as the user maneuvers the sweeper 16 over the surface to be cleaned. The user can press the power switch 88 a third time to deactivate the cleaning process and a fourth time to power down the sweeper 16. In another example, the sweeper 16 can be provided with an additional switch, separate from the power switch 88 on either the body of the sweeper 16, such as on the upper housing 22, or the signal emitting device 73 to actuate the brush assembly 28.

In another example, the cleaning functionality of the sweeper 16 can be actuated based on a target projection detected by the receiving sensors 72. For example, the brush assembly 28 can be actuated by the user by projecting a target using the signal emitting device 73 at a single location for a predetermined amount of time. Alternatively, the brush assembly 28 can be actuated by the user by using the signal emitting device 73 to project a target pattern of light signals that can be detected by the receiving sensors 72. For example, the user can alternately actuate and release the trigger 118 to project a light signal consisting of a series of flashing target projections on the surface that the receiving sensors 72 can detect as a signal to actuate the brush assembly 28 and initiate the cleaning process.

In an additional example, the signal emitting device 73 can include a user interface portion having multiple controls, each of which emit a different type or kind of signal as its target projection. In one example, a first type or kind of target projection can direct the cleaning apparatus to drive to the location of the target projection and perform spot cleaning operations generally in the vicinity of the location of the target projection. In another example, a second type or kind of target projection can direct the cleaning apparatus to enter a "following mode" in which the cleaning apparatus would simply drive toward the location of the target projection, and change course as the location of the target projection changed. Other modes could direct the cleaning mode to be activated or inactivated (i.e., simply a "driving" mode with no cleaning being performed). Non-limiting examples of different type of kinds of signal include projections having different wavelengths, shapes and/or patterns.

The cleaning device 10 can be controlled to initiate one or more different cleaning processes, such as sweep, vacuum, extract or dispense a liquid or initiate one or more different types of modes, such as a spot or following mode depending on the projection target detected by the receiving sensors 72.

In one example of a method of use of the cleaning device 10, the sweeper 16 can be controlled in a spot cleaning mode such that the user can control the sweeper 16 to clean a specific location or spot within a room, such as the location of a spill, for example. The user can use the signal emitting device 73 to direct the sweeper 16 to the target location of the spill by actuating the power switch 88 and projecting the infrared light at the desired location using the signal emitting device 73. The overlapping infrared and visible light projections assist the user in visually identifying that the infrared light is projected at the desired location. The sweeper 16 can detect the infrared target projection using the receiving sensors 72 and control the drive wheel motors 64, 66 to maneuver the sweeper 16 to the target projection. If the target projection is hidden from the field of view of the receiving sensors 72, by a piece of furniture for example, or located in a different room than the sweeper 16, the user can incrementally guide the sweeper 16 to the target by projecting the infrared target at discrete spots along a desired route leading to the target. As the sweeper 16 maneuvers to each infrared projection, the user can use the signal emitting device 73 to project the infrared target to the next spot along the desired route to the target. Alternatively, the user can guide the sweeper 16 to the target by projecting a continuous path to the target by slowly moving the infrared light projection along the desired path in the field of view of the receiving sensors 72. This is similar to a following mode in which the cleaning apparatus would simply drive toward the location of the target projection, and change course as the location of the target projection changed. When the sweeper 16 reaches the target, the user can initiate the cleaning process by actuating the power switch 88 for a second time, for example, or using the signal emitting device 73 to project a signal representative of the desired spot cleaning function. The sweeper 16 can be programmed to enter a spot cleaning mode wherein the sweeper 16 initiates an outward spiral starting at the target projection. Alternatively, the user can manually guide the sweeper 16 to clean the area in the vicinity of the target projection by using the signal emitting device 73 to maneuver the sweeper 16 according to the user's desired spot cleaning pattern.

Alternative examples of a spot cleaning mode include programming the sweeper 16 to move in a zig-zag or other pattern to clean a predetermined area adjacent to and including the target projection. The spot cleaning mode can also include controlling the sweeper 16 to maneuver over the target at a slower speed than the normal travel speed. The spot cleaning mode can also include the actuation of additional cleaning functionalities such as the dispensing of a cleaning solution or fragrance depending on the type of cleaning device 10.

In another example of a method of use of the cleaning device 10, the sweeper 16 can be controlled in a room cleaning mode such that a user can guide the sweeper 16 to clean a room or other large area. Similar to the method of use in the spot cleaning mode, the user can guide the sweeper 16 around an area to be cleaned by using the signal emitting device 73 to project an infrared target onto the surface to be cleaned in the field of view of the receiving sensors 72. The user can guide the sweeper 16 around the area to be cleaned by projecting the infrared spot on the surface to be cleaned at consecutive, discrete locations along the desired cleaning path. Alternatively, the user can guide the sweeper 16 along the desired cleaning path by projecting a continuous path within the area to be cleaned by slowly moving the projection of the infrared target along the desired path in the field of view of the receiving sensors 72.

To use the hands-free signal emitting device 73', the user fits the elastic straps 128 around the user's head and adjusts the securing mechanism 132 to ensure a snug fit. The user can then actuate the power switch 134 to deliver power from the battery pack 116' to the transmitter 75'. Upon receiving power, the transmitter 75' emits an infrared beam 104' and a visible light beam 106' simultaneously. The beams are transmitted through the lens 100' where the concave focal region 108' focuses the beams into overlapping infrared and visible projected spots 110', 112' on a cleaning surface. A user can maneuver his or her head and neck to manipulate the position of the projected spots 110', 112'. The user can then control the sweeper 16 to maneuver over and clean a surface to be cleaned as described previously.

The cleaning device and method of operation of the invention disclosed herein provides a user with a cleaning device that can be intuitively controlled by a user remote from the cleaning device and the area to be cleaned. The user can control the movement of the cleaning device simply by projecting an infrared target signal to the desired location using a signal emitting device. This method of controlling the movement of the cleaning device is simpler and more intuitive than traditional types of remote controls, such as those that rely on radio frequency. Using an infrared projection eliminates the need for complicated control mechanisms such as joysticks and arrow buttons that can be difficult to use, especially for individuals who have decreased hand control and dexterity. According to the present invention, the cleaning device can be simply controlled by pointing a signal emitting device at the desired location. This method is more intuitive than a joystick and provides a method for individuals with little or no hand dexterity to use the cleaning device with either a hand-held signal emitting device or a hands-free device. This can provide disabled individuals with an additional level of independence by providing them with a cleaning device that is simple and easy to control.

An additional benefit of the cleaning device and method of operation of the present invention is that the cleaning device can be controlled to move to a target location remote from the user and the signal emitting device. Because the cleaning device is controlled to maneuver towards the target projection and not the signal emitting device, a user can control the movement of the cleaning device from a remote location, such as a different room, while sitting on a couch or in a wheel chair. In this manner it is not necessary for the user to physically move to direct the cleaning device to the desired location. The user can select a target location within a large area of view of the user by simply pointing the signal emitting device in a different direction or at a different angle. This minimizes the energy required by the user for controlling the cleaning device, which can be particularly beneficial for disabled individuals.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system for directing a cleaning apparatus on a surface to be cleaned comprising:
   a body having a floor cleaner;
   at least one wheel rotatably coupled with the body and operably interconnected with a motor for imparting motion to the wheel, and a controller for providing a signal to the motor to control the motion of the at least one wheel;
   at least one sensor coupled with the body and operably interconnected to the controller for detecting a target projection on the surface at a distance spaced from the body;
   a signal emitting device separate from the body comprising a user interface portion configured to receive signals from a user and transmit a representation of those signals to a target projection on the surface, wherein the representation of those signals has a shape; and
   wherein the sensor on the body is configured to detect the target projection on the surface and the controller is configured to initiate at least one function to be performed by the body of the cleaning apparatus on the surface based on the detected target projection, wherein the at least one function comprises at least one driving function wherein the controller is configured to provide signals to the motor to control the motion of the at least one wheel to move the cleaning apparatus to the location of the target projection on the surface to be cleaned or a cleaning function wherein the controller is configured to operate the floor cleaner body of the cleaning apparatus to perform a cleaning operation on the surface to be cleaned at the location of the target projection on the surface and the at least one function is determined based upon a shape of the detected target projection.

2. The system of claim 1 wherein the at least one function comprises a spot cleaning function to be performed generally at the location of the target projection on the surface.

3. The system of claim 1 wherein the at least one function comprises a target projection following function wherein the motor is configured to control the motion of the at least one wheel to move the body toward the location of the target projection, and changes course as the location of the target projection changes.

4. The system of claim 1 wherein the body further comprises a suction device operably interconnected with a debris opening and a collector for facilitating the withdrawal of debris from the surface toward the collector through the debris opening.

5. The system of claim 1 wherein the signal emitting device comprises a handle and the user interface portion comprises at least one button located adjacent the handle.

6. The system of claim 1 wherein the signal emitting device comprises a head-engaging band.

7. The system of claim 1 wherein the cleaning apparatus comprises an autonomous cleaning robot and wherein the controller is configured to initiate the at least one function to be performed based on the detected target projection as part of a mode of operation of the autonomous cleaning robot.

8. The system of claim 1 wherein the target projection comprises emitted light.

9. The system of claim 8 wherein the target projection comprises a coaxial emission of at least two different wavelengths of light.

10. The system of claim 8 wherein the target projection comprises infrared light.

11. The system of claim 8 wherein the target projection comprises visible light.

12. The system of claim 8 wherein the target projection comprises a combination of infrared light and visible light.

13. The system of claim 1 wherein the user interface portion comprises a plurality of controls, each of which emits a different type of target projection.

14. The system of claim 13 wherein the controller is configured to initiates a different one of the at least one function depending on the type of target projection detected.

15. A method for directing a cleaning apparatus on a surface to be cleaned, the method comprising the steps of:

providing a cleaning apparatus on the surface to be cleaned, wherein the cleaning apparatus comprises a body having a floor cleaner, at least one wheel operably interconnected with a motor for imparting motion to the wheel, a controller for providing a signal to the motor to control the motion of the at least one wheel, and at least one sensor operably interconnected to the controller for detecting a target projected on the surface at a distance spaced from the body; and projecting a target on the surface at a location spaced from the cleaning apparatus, wherein the cleaning apparatus initiates at least one function based upon the detection of the target, wherein the at least one function comprises at least one driving function wherein the controller provides signals to the motor to control the motion of at least one wheel to move the cleaning apparatus to the location of the target projection on the surface to be cleaned or a cleaning function wherein the controller operates the floor cleaner body of the cleaning apparatus to perform a cleaning operation on the surface to be cleaned at the location of the target projection on the surface and the at least one function is determined based upon a shape of the detected target projection.

16. The method of claim 15 wherein the step of projecting a target comprises projecting a target of at least one of infrared and visible light.

17. The method of claim 15 and further comprising the step of selecting a desired function and the step of projecting the target comprises projecting a target representative of the desired function.

18. The method of claim 15 wherein the cleaning apparatus comprises an autonomous cleaning robot and further comprising initiating the at least one function to be performed based on the detected target projection as part of a mode of operation of the autonomous cleaning robot.

19. A system for directing a cleaning apparatus on a surface to be cleaned comprising:

a body having a floor cleaner;

at least one wheel rotatably coupled with the body and operably interconnected with a motor for imparting motion to the wheel, and a controller for providing a signal to the motor to control the motion of the at least one wheel;

at least one sensor coupled with the body and operably interconnected to the controller for detecting a target projection on the surface at a distance spaced from the body;

a signal emitting device separate from the body comprising a user interface portion configured to receive signals from a user and transmit a representation of those signals to a target projection on the surface, wherein the representation of those signals has a shape; and wherein the sensor on the body is configured to detect the shape of the target projection on the surface and the controller is configured to initiate at least one function to be performed by the body of the cleaning apparatus on the surface based on the shape of the detected target projection.

* * * * *